O. P. Drury,

Harvester Pitman.

N° 80,614. Patented Aug. 4. 1868.

Witnesses;
W. C. asketter
Wm. A. Morgan

Inventor;
O. P. Drury
per Munn & attorneys

UNITED STATES PATENT OFFICE.

OLIVER P. DRURY, OF NILES, MICHIGAN.

IMPROVEMENT IN HARVESTER-PITMEN.

Specification forming part of Letters Patent No. 80,614, dated August 4, 1868.

*To all whom it may concern:*

Be it known that I, OLIVER P. DRURY, of Niles, in the county of Berrien and State of Michigan, have invented a new and useful Improvement in Couplings for Sickle-Pitmen; and I do hereby declare that the following is a full, clear, and exact description thereof, which will enable others skilled in the art to make and use the same, reference being had to the accompanying drawings, forming part of this specification, in which—

Figure 1:
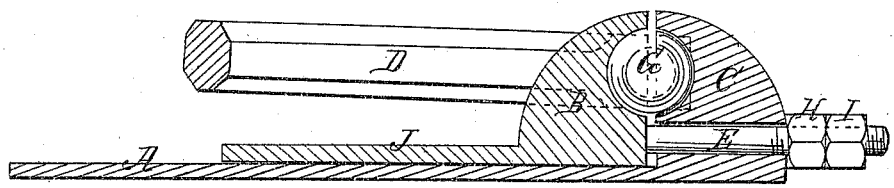
Figure 2:
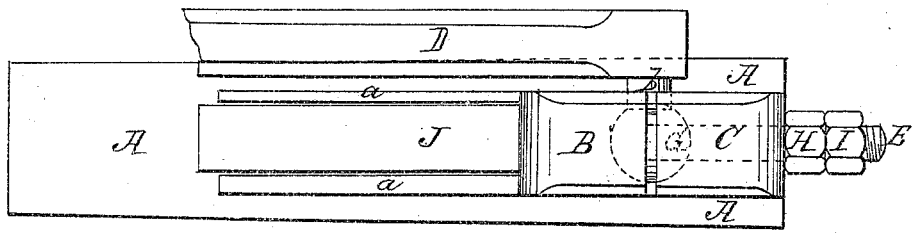

Figure 1 is a sectional view of my invention. Fig. 2 is a top view of the same.

Similar letters of reference indicate corresponding parts.

The object of this invention is to provide a strong, durable, and easily-working coupling device for connecting the pitman of a reaping or mowing machine with the sickle-back of the same.

It consists of the formation and arrangement of parts as set forth in the following.

A is the sickle-back, to which the sickle-teeth or cutters are affixed. A reciprocating motion is given to almost all mowing and reaping machines by means of a connecting-rod or pitman, and many devices have been employed to accomplish the coupling or connecting of the end of the pitman with the sickle-back in such a manner that it will not wear, become loose, and choke up with grass or other foreign matter.

The rapid motion to which the sickle and pitman are subjected causes more wear upon this part of the machine than any other, and the coupling devices heretofore in use were more or less imperfect and objectionable.

By my improvement the maximum durability is obtained without impairing the quality of rapid movement.

The sickle-back A is provided with a jaw, C, which is formed thereon when the back is made, and subsequently affixed thereto by welding or other suitable means. This jaw has a hemispherical cavity, corresponding to a similar cavity in the movable jaw B, which latter is provided with an extension, J, having dovetailed edges, which fit with finished contact between the lateral guide-ribs *a a*. These guide-ribs are affixed to or formed on the sickle-back, and are further formed with dovetailed inner edges, to correspond to the similar edges of the extension J, working against them.

Thus the jaw B is movable toward the fixed jaw C, whereby the hemispherical cavities in the proximate faces of the jaws are brought together, to form a spherical cavity or socket for the ball G, affixed laterally to the end of the pitman D. The neck *b*, connecting the ball with the pitman, is inclosed between corresponding semicircular recesses formed in the sides of the jaws.

A screw stem or bolt, E, is lapped into or formed in the plane face of the jaw B, below the cavity of the latter, and passes to the rear of the jaw C through a hole in the latter, in which the bolt E fits with finished contact. A screw-thread is cut on the end of the said bolt, and a nut, H, and jam-nut I, are fitted thereon.

The ball G is inserted between jaws, which are drawn together by the nut H, and held so by the jam-nut I, by which latter device the ball may be clamped with the proper looseness for high speed, and still not liable to work loose.

I am aware that ball-and-socket joints for this purpose are not new, and do not claim such, broadly.

Having thus described my invention, I claim as new and desire to secure by Letters Patent—

The described construction of the coupling, consisting of the recessed jaw C, formed upon the bar A, the recessed jaw B, provided with the extension J, adapted to be moved between the guides *a a* by means of the screw-bolt E, extending through the jaw C, all operating as described, the proximate recesses in the jaws B C receiving the ball G upon the shank of the pitman D, as herein set forth and shown.

OLIVER P. DRURY.

Witnesses:
JOSEPH S. BACON,
L. H. SIMMONS.